US005130902A

United States Patent [19]

Schmid et al.

[11] Patent Number: 5,130,902

[45] Date of Patent: Jul. 14, 1992

[54] LIGHT, IN PARTICULAR FOR MOTOR VEHICLES

[75] Inventors: Heinrich Schmid, Nürtingen; Margret Schmock von Ohr, Reutlingen, both of Fed. Rep. of Germany

[73] Assignee: Robert Bosch GmbH, Stuttgart, Fed. Rep. of Germany

[21] Appl. No.: 576,405

[22] PCT Filed: Jul. 8, 1989

[86] PCT No.: PCT/DE89/00454

§ 371 Date: Aug. 31, 1990

§ 102(e) Date: Aug. 31, 1990

[30] Foreign Application Priority Data

Feb. 24, 1989 [DE] Fed. Rep. of Germany ....... 3905674

[51] Int. Cl.[5] ............................................ B60Q 1/00

[52] U.S. Cl. ........................................ 362/61; 362/80; 362/297; 362/346; 362/349

[58] Field of Search .................... 362/61, 80, 297, 346, 362/349

[56] References Cited

U.S. PATENT DOCUMENTS

| | | | |
|---|---|---|---|
| 1,841,917 | 1/1932 | Schimpff | 362/349 |
| 2,913,570 | 11/1959 | Gough et al. | 240/3 |
| 3,401,258 | 9/1968 | Guth | 240/103 |
| 4,035,631 | 7/1977 | Day, Jr. | 240/41.35 |
| 4,347,554 | 8/1982 | Matsushita | 362/297 |
| 4,494,176 | 1/1985 | Sands et al. | 362/346 |

FOREIGN PATENT DOCUMENTS

| | | |
|---|---|---|
| 753691 | 5/1943 | Fed. Rep. of Germany . |
| 2528537 | 12/1983 | France . |
| 1140417 | 1/1969 | United Kingdom . |

*Primary Examiner*—Ira S. Lazarus
*Assistant Examiner*—Sue Hagarman
*Attorney, Agent, or Firm*—Michael J. Striker

[57] ABSTRACT

A lamp for a motor vehicle has a light source and a reflector for reflecting light rays generated by the light source. The reflector has a body formed at least partially by rotation of a parabolic generatrice by a predetermined angle about a focal point of the reflector. The lamp includes a diffusing plate that covers the light exit aperture of the reflector and directs light rays emitted from the reflector substantially parallel to the optical axis of the reflector.

6 Claims, 3 Drawing Sheets

LIGHT, IN PARTICULAR FOR MOTOR VEHICLES

BACKGROUND OF THE INVENTION

The invention relates to a lamp comprising a light source, a reflector having a body formed by a parabolic generatrice rotatable about the optical axis of the reflector, and a diffusing plate covering the light exit aperture of the reflector.

Lamps comprising a reflector produced by rotation of a paraboloic generatrice whose axis coincides with the optical axis of the reflector, are known. In order to provide a large solid angle for radiation of light and, thus, for a large light flux to meet the legal requirements to lighting, these lamps are designed with large diameter and mounting depth. However, for aerodynamic and styling reasons, increasingly small mounting spaces are available in motor vehicles for accommodating the lamps.

SUMMARY OF THE INVENTION

The object of the invention is a lamp that occupies less space but permits to obtain the same light flux as with larger conventional lamps. The object of the invention is achieved by providing a lamp in which the reflector is formed by rotation of the parabolic generatrice by an angle around a predetermined focal point of the reflector on the optical axis thereof, and the diffusing plate directs the light from the reflector substantially parallel to the optical axis of the reflector.

Temperature reduction in the central region of the diffusing plate is achieved, according to the invention, by forming a section of the reflector from which light is reflected into the central region, with a generatrice having a non-parabolic curve.

Additional reduction of the temperature in the central region of the diffusing plate is achieved, according to the invention, by replacing a circular surface of the non-parabolic section of the reflector with a surface having a perimeter consisting of a plurality of short sections that deviate from the circular surface and form facets extending over the non-parabolic section of the reflector.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENTS

Figure 1:
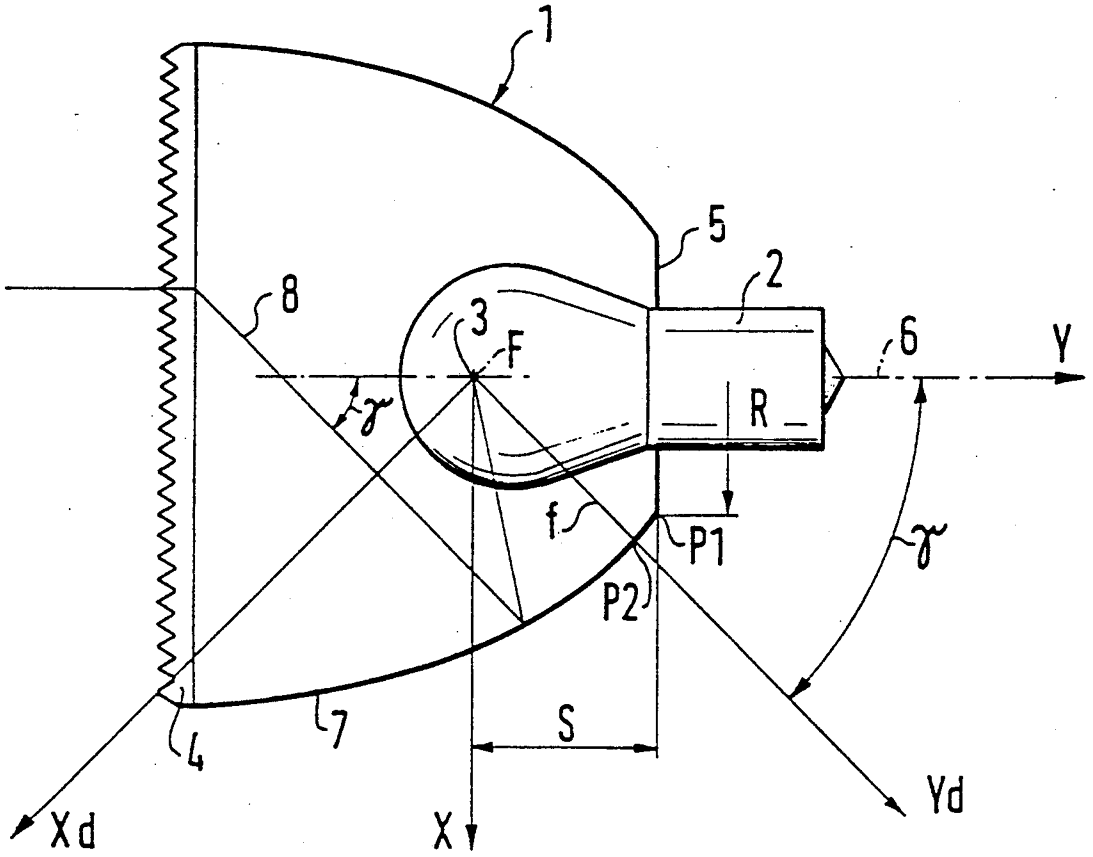
FIG. 1 shows a longitudinal side view of a first embodiment of a lamp according to the present invention.

A lamp illustrated in FIG. 1 consists of a reflector 1, a bulb 2 arranged in the apex region of the reflector 1, and a diffusion plate 4 covering the light exit aperture of the reflector 1. The spiral-wound filament 3 of the bulb 2 is arranged in the focal point F of the reflector 1.

In a first embodiment of the lamp illustrated in FIG. 1, the reflector 1 formed by rotation of a parabolic generatrice 7, termed parabola 7 for short below, by an angle $\gamma$ around the focal point F of the reflector 1 forming a surface of the reflector 1 around an optical axis 6 of the reflector 1. The focal point F of the reflector 1 is at the same time focal point of the parabola 7. Since the parabola 7 is rotated around the focal point F by the angle $\gamma$, the light, for example of a light ray 8, does not emerge from the reflector 1 in parallel with the optical axis 6, but rather inclined at the angle $\gamma$. The diffusion plate, 4 is constructed as an annular lens which directs the light ray 8 in parallel with the optical axis 6.

Figure 2:
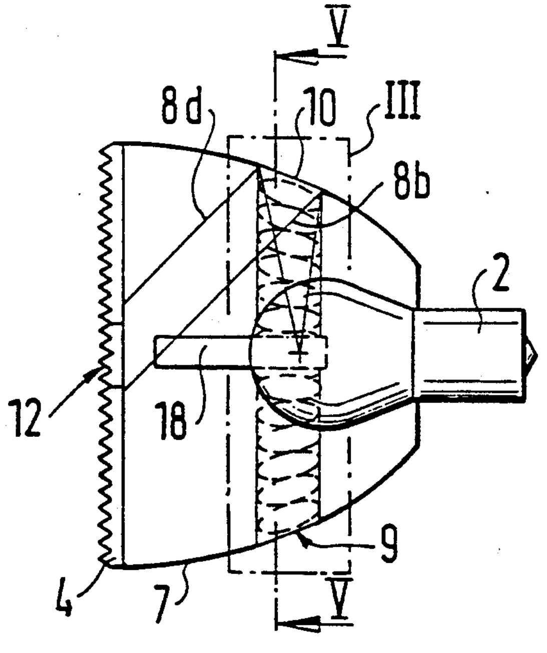
FIG. 2 shows the same view as the FIG. 1 of a second embodiment of a lamp according to the present invention.

In a second light embodiment of the lamp illustrated in FIG. 2, the parabola 7 is replaced in a section 9 from which light is reflected into the central region 12 of the diffusion plate, 4 by segments of other curves. The section 9 represents a section of a reflector from which light rays are reflected to the central portions 12 of the diffusing plate at an angle to the optical axis. The parabola 7 forming the reflector 1 is replaced in the section 9 by a straight line 10, so that here a pitch cone surface is formed upon rotation of the parabola 7 around the optical axis 6.

Figure 3:
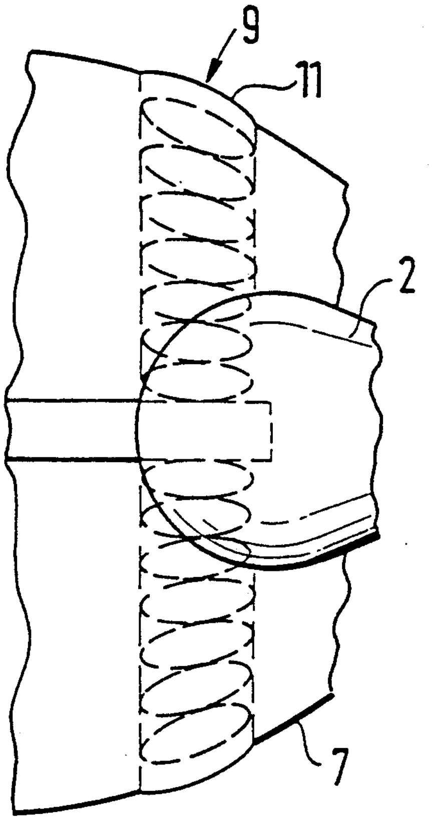
FIGS. 3–7 show five different versions of a section of a lamp designated by Roman numeral III in FIG. 2.
Figure 4:
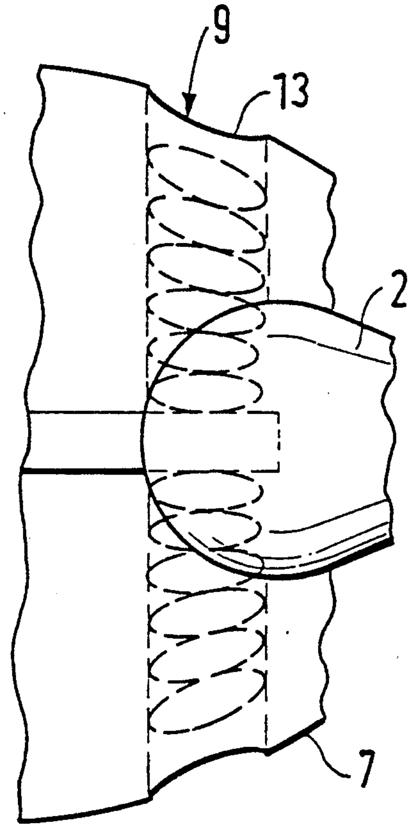

In a first version illustrated in FIG. 3, the parabola 7 is replaced by a circular line 11 arched away from the optical axis 6 in the section 9. In a second version illustrated in FIG. 4, the parobola 7 is replaced by a circular line 13 arched towards the optical axis 6.

By the replacement of the parabola 7 by other types of curves, it is achieved that the light rays which are reflected from the section 9, no longer meet in the central region of the diffusion plate 5. As a result, no concentration of light rays occurs in the central region 12 of the diffusion plate 4, and no high temperatures result which could cause the diffusion plate 4 to melt if it is manufactured from plastic.

Figure 5:
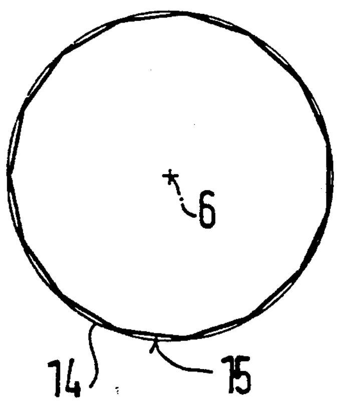

In a third version illustrated in FIG. 5, the circumferential line 14, which is circular in a cross-section perpendicular to the optical axis 6, of the reflector 1 is divided in the section 9 into short straight segments 15, so that in this section 9 the reflector 1 is formed by plane facet segments.

Figure 6:
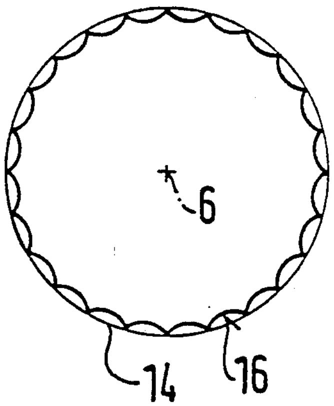
Figure 7:
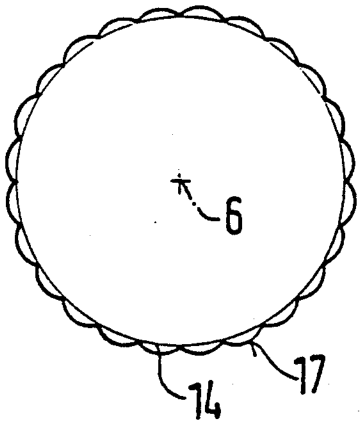

In a fourth variant illustrated in FIG. 6, the circumferential line 14 is divided into short circular segments 16 arched towards the optical axis 6, and in a fifth version illustrated in FIG. 7, the circumferential line 14 is divided into short circular lines 17 arched away from the optical axis 6, which results in both cases in correspondingly arched facets. By the division of the cicumferential line 14, a further temperature reduction in the central region 12 of the diffusion plate 4 is achieved.

The crossing of the light rays reflected from the reflector 1 which crossing generates the high temperature, is limited to a region 18 inside the light around the optical axis 6 between bulb 2 and a certain distance from the diffusing plate 4.

Figure 8:
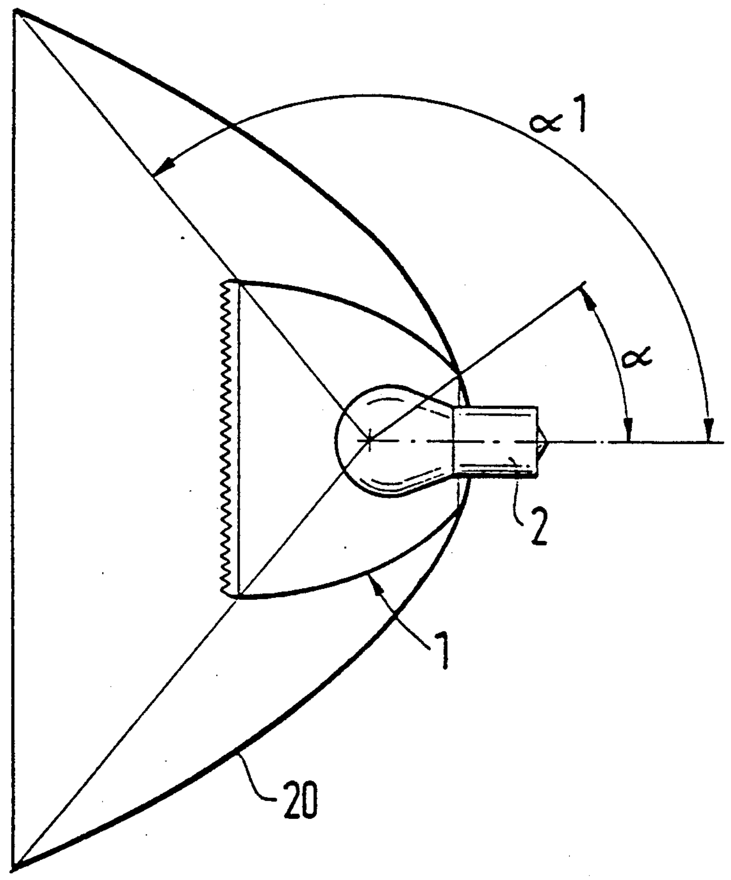
FIG. 8 shows a comparative view illustrating a light ray obtained with a lamp according to the present invention and a light ray obtained with a conventional lamp.

In FIG. 8, a light beam obtained with a conventional parabolic reflector 20 and, for comparison, the light beam obtained with the reflector 1 formed by the rotated parabola 7 are illustrated. Both light beams enclose with their reflectors 1 and 20 the same solid angle $\omega$. The solid angle $\omega$ is defined by angle a shown in FIG. 8, said angle being defined by the diameter of the lamp aperture 5 from the focal point f and by the aperture diameter, and from the angle of aperture $\alpha 1$ of the reflectors as:

$$\omega = 2\,\omega \cdot (\cos\alpha - \cos\alpha 1)$$

With identical bulbs, the two reflectors 1 and 20 taken the same light flux, since the latter depends only on the light intensity I of the bulb and the enclosed solid angle $\omega$ according to the equation:

$$\Phi = \omega \cdot I$$

In FIG. 8, the space-saving design of the light according to the invention is clear.

The calculation of the reflector 1 is explained below. To calculate the reflector 1, initially a first coordinate system is determined, the axis Y of which coincides with the optical axis 6 and the axis X of which is arranged extending perpendicularly to the axis Y through the focal point F of the reflector 1, as illustrated in FIG. 1. The angle $\gamma$, by which the parabola 7 is rotated around the focal point F and at which the light 8 is to be reflected from the reflector 1 is predetermined.

The radius R and the distance S of the lamp aperture 5 are determined by the dimensions of the bulb 2. Thus, a first point P1 of the parabola 7 is known. Now, a second coordinate system, likewise rotated by the angle $\gamma$ around the focal point F, having the axes Yd and Xd is introduced. In this rotated coordinate system, the further points of the parabola are calculated. The point P1 has the coordinate S on the axis Y in the first coordinate system and the coordinate R on the axis X.

The coordinates of a point P in the rotated coordinate system Yd, Xd can be calculated as a function of its coordinates Y, X in the first coordinate system and of the angle $\gamma$ according to the following, generally known transformation equations:

$$Yd = \cos\gamma \cdot ((\tan\gamma \cdot x) + y)$$

$$Xd = \cos\gamma \cdot (x - (\tan\gamma \cdot y))$$

With the coordinates Y=S and X=R the following is obtained for the point P1:

$$yd1 = \cos\gamma \cdot ((\tan\gamma \cdot R) + S)$$

$$xd1 = \cos\gamma \cdot (R - (\tan\gamma \cdot S))$$

Since the coordinate system Yd, Xd is rotated with the parabola 7 by the angle $\gamma$ around the focal point F, the apex point P2 of the parabola 7 lies on the axis Yd of the rotated coordinate system. The distance f of the apex point P2 from the focal point F which is termed the focal length of the parabola 7, can be calculated according to the following equation:

$$f = yd2 = \frac{1}{2} \cdot \left(yd1 + \sqrt{(yd1)^2 + (xd1)^2}\right)$$

The general equation of a parabola in the rotated coordinate system is:

$$Yd = d \cdot (xd)^2 + b$$

The coefficients a and b can be determined by inserting the coordinates of the known points P1 and P2 in the above equation for calculating Yd. Thus, for a and b the following is obtained:

$$a = -\frac{1}{2 \cdot f}$$

$$b = f$$

Therefore, the equation of parabola 7 in the rotated coordinate system is:

$$yd = -\frac{1}{2 \cdot f} \cdot (xd)^2 + f$$

The points of the parabola 7 can now be calculated in the rotated coordinate system.

with the following inverse transformation equations, the coordinates of the points in the original coordinate system can be calculated:

$$y = \sin\gamma \left[\frac{(xd)^2}{-2 \cdot f} + f\right] + (xd + sw) \cdot \cos\gamma$$

$$x = \cos\gamma \left[\frac{(xd)^2}{-2 \cdot f} + f\right] + (xd + sw) \cdot \sin\gamma$$

Here, for the coordinate Xd, the value for the last calculated point is to be inserted in each case. From one point to the next, the value for Xd is increased by one step SW which is freely selectable but to be held constant in each case. The smaller the step SW selected, the more accurately can the parabola 7 be calculated.

While the invention has been illustrated and described as embodied in a lamp for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed as new and desired to be protected by Letters Patent is set forth in the appended claims.

1. A lamp comprising a light source; a reflector for reflecting light rays generated by said light source and having an optical axis and being formed by a body arising by means of rotation of an at least partially parabolic generatrice about said optical axis, said at least partially parabolic generatrice being part of a parabola which has been rotated about a predetermined focal point F of said reflector, said reflector reflecting said light rays generated by said light source inclined to the optical axis and having a light exit aperture; a diffusing plate covering said light exit aperture and directing said inclined light rays reflected by said reflector substantially parallel to the optical axis of said reflector; said diffusing plate having a central region and said at least partially parabolic generatrice having a non-parabolic portion corresponding to a section of said reflector from which light rays are reflected into said central region of said diffusing plate.

2. A lamp according to claim 1, wherein said non-parabolic portion comprises a straight line.

3. A lamp according to claim 1, wherein said non-parabolic portion comprises one of concave line and convex line.

4. A lamp according to claim 1, wherein said said non-parabolic portion comprises a plurality of short lines that are connected with each other and deviate from a circular line so that said section of said reflector from which light rays are reflected into said central region of said diffusing plate, consists of a plurality of facets extending over a perimeter of said section of said reflector.

5. A lamp according to claim 4, wherein said plurality of short lines comprises a plurality of straight lines.

6. A lamp according to claim 4, wherein said plurality of short liens comprises a plurality of circular arc lines.

* * * * *